United States Patent
Cho et al.

(10) Patent No.: US 8,754,356 B2
(45) Date of Patent: Jun. 17, 2014

(54) SINGLE PHOTON DETECTOR AND PHOTON NUMBER RESOLVING DETECTOR

(75) Inventors: Seok-Beom Cho, Daejeon (KR); Tae-Gon Noh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 285 days.

(21) Appl. No.: 13/249,273

(22) Filed: Sep. 30, 2011

(65) Prior Publication Data

US 2012/0085891 A1   Apr. 12, 2012

(30) Foreign Application Priority Data

Oct. 6, 2010   (KR) .................. 10-2010-0097298
Jan. 12, 2011   (KR) .................. 10-2011-0003146

(51) Int. Cl.
*H03F 3/08*   (2006.01)

(52) U.S. Cl.
USPC ........................................... 250/214 R

(58) Field of Classification Search
USPC ............................. 250/214.1, 214 R
See application file for complete search history.

(56) References Cited

U.S. PATENT DOCUMENTS 6,218,657 B1 *   4/2001   Bethune et al. ........... 250/214 R
7,705,284 B2      4/2010   Inoue et al.

FOREIGN PATENT DOCUMENTS

WO   WO-2007/102430 A1   9/2007
WO   WO-2009/084744 A2   7/2009

OTHER PUBLICATIONS

Z. L. Yuan et al., "High speed single photon detection in the near infrared", Applied Physics Letters, vol. 91, pp. 041114-01114-3, (Jul. 2007).
N. Namekata et al., "800 MHz Single-photon detection at 1550-nm using an InGaAs/InP avalanche photodiode operated with a sine wave gating", Optics Express, vol. 14, No. 21, pp. 10043-10049 (Oct. 2006).
B. E. Kardynal et al., "An avalanche-photodiode-based photon-number-resolving detector", Nature Photonics, vol. 2, pp. 425-428 (Jul. 2008).

* cited by examiner

*Primary Examiner* — Thanh Luu
(74) *Attorney, Agent, or Firm* — Rabin & Berdo, P.C.

(57) ABSTRACT

Provided is a single photon detector and a photon number detector which use an APD and include an auxiliary signal generator, a light receiving element, a mixer, and a determiner. The auxiliary signal generator generates an auxiliary signal. The light receiving element receives a photon to output an electric signal. The mixer receives and mixes an output signal of the light receiving element and the auxiliary signal. The determiner determines whether the photon is received or the number of received photons. The single photon detector and photon number resolving detector detect an avalanche of an amplitude less than the amplitude of a capacitive response. A probability that an after pulse is generated can be reduced. A photon count rate is enhanced. The influence on the waveform of the gate signal can be decreased. The frequency of the gate signal can be continuously changed.

10 Claims, 8 Drawing Sheets

MS(Mixed Signal)

SINGLE PHOTON DETECTOR AND PHOTON NUMBER RESOLVING DETECTOR

CROSS-REFERENCE TO RELATED APPLICATIONS

This U.S. non-provisional patent application claims priority under 35 U.S.C. §119 of Korean Patent Application Nos. 10-2010-0097298, filed on Oct. 6, 2010, and 10-2011-0003146, filed on Jan. 12, 2011, the entire contents of which are hereby incorporated by reference.

BACKGROUND OF THE INVENTION

The present invention disclosed herein relates to a photon detector, and more particularly, to a single photon detector and a photon number resolving detector, which use an avalanche photo diode.

With the advance of quantum encryption communication and information communication technologies, technology of detecting a photon is becoming increasingly more important. Particularly, an InGaAs/InP type of avalanche photo diode is mostly used in single photon detectors that are used in a telecommunication band such as 1.3 µm to 1.5 µm and detect an optical signal that is weak in intensity as in a single photon level. InGaAs/InP type of avalanche photo diodes are mostly used in a gated Geiger mode.

When an avalanche photo diode operates in a gated Geiger mode, some of charge carriers generated in an avalanche arising operation are not immediately vanished. Charge carriers that are not completely vanished are left inside an avalanche photo diode, and when a next gate signal is applied to the avalanche photo diode, the left charge carriers lead to an avalanche. Such an effect is called an after-pulsing effect, which is one of important causes that raise an error in detecting a photon.

As a method of reducing errors due to the after-pulsing effect in detecting a photon, there is a method that sets a dead time sufficient to remove the charge carriers that are left inside an avalanche photo diode without being vanished after an avalanche arises. That is, a dead time is set in which a gate signal is not applied to an avalanche photo diode for a predetermined time after an avalanche arises.

However, since typical photon detectors detect a relatively large avalanche, there are relatively many charge carriers that are left without being vanished. Therefore, a dead time sufficient to remove the left charge carriers is required to be set long. As a result, such an after-pulsing effect and dead time are important factors that determine a gating frequency of a gate signal and the limit of a photon count rate, and thus, typical single photon detectors operate at a gate frequency of about 10 MHz or less.

SUMMARY OF THE INVENTION

The present invention provides a single photon detector and a photon number resolving detector, which detect an avalanche of an amplitude less than the amplitude of a capacitive response.

The present invention also provides a single photon detector and a photon number resolving detector, which decrease a probability that an after pulse is generated.

The present invention also provides a single photon detector and a photon number resolving detector, which have an enhanced photon count rate.

The present invention also provides a single photon detector and a photon number resolving detector, which decrease the influence on a waveform of a gate signal.

The present invention also provides a single photon detector and a photon number resolving detector, which enable the continuous change in a frequency of a gate signal.

Embodiments of the present invention provide a single photon detector including: an auxiliary signal generator generating an auxiliary signal; a light receiving element receiving a photon to output an electric signal; a mixer receiving and mixing an output signal of the light receiving element and the auxiliary signal; and a determiner receiving a mixed signal of the mixer to determine whether the photon is received.

In some embodiments, the light receiving element may be an avalanche photo diode, and the electric signal may include an avalanche signal.

In other embodiments, the determiner may include an avalanche determiner determining whether an avalanche occurs.

In still other embodiments, a threshold level of the avalanche determiner may be set higher than a predetermined amplitude of a capacitive response of the avalanche photo diode.

In even other embodiments, the avalanche photo diode may operate in a gated Geiger mode.

In yet other embodiments, the single photon detector may further include a gate signal generator generating a gate signal to deliver the gate signal to the avalanche photo diode.

In further embodiments, the single photon detector may further include a time delayer aligning the avalanche signal or the auxiliary signal in time.

In still further embodiments, the single photon detector may further include a controller controlling a waveform and amplitude of the avalanche signal or auxiliary signal.

In other embodiments of the present invention, a photon number detector includes: an auxiliary signal generator generating an auxiliary signal; a light receiving element receiving a photon to output an electric signal; a mixer receiving and mixing an output signal of the light receiving element and the auxiliary signal; and a photon number determiner receiving a mixed signal of the mixer to determine the number of photons received by the light receiving element.

In some embodiments, the photon number determiner may classify the mixed signal based on intensity to determine the number of received photons.

In other embodiments, the photon number determiner may have a plurality of threshold levels, each of which may be set higher than a predetermined amplitude of a capacitive response of the light receiving element and set to classify the mixed signal, which is generated due to N number of photons (where N is a natural number), based on intensity.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
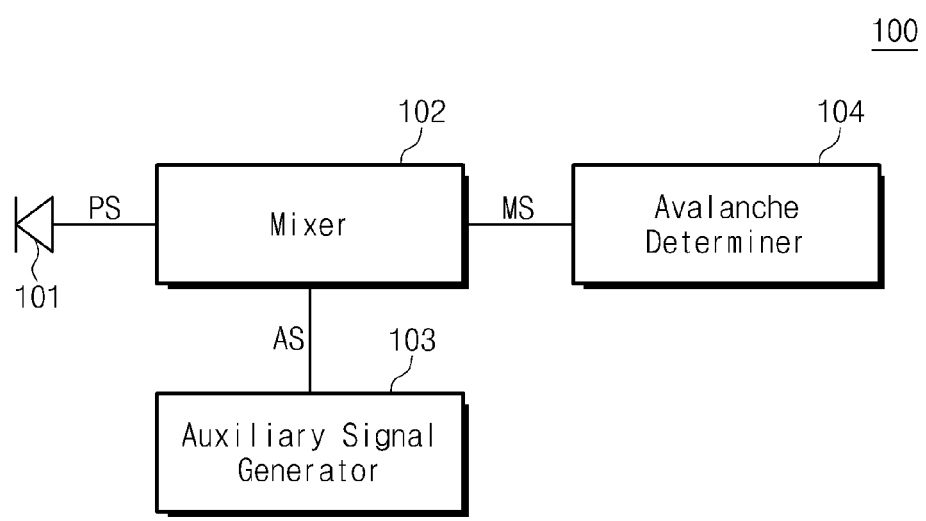
FIG. 1 is a diagram illustrating a single photon detector according to a first embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

When a gate signal is applied for operating an avalanche photo diode in a gated Geiger mode, a unique capacitive response of the avalanche photo diode is generated. Therefore, when a photon is inputted to the avalanche photo diode and thus an avalanche arises, an output of the avalanche photo diode becomes a signal that is generated by mixing the capacitive response and an avalanche signal.

A capacitive response signal of a typical avalanche photo diode oscillates periodically, and the amplitude of the oscillation is progressively attenuated with time and then the oscillation is vanished after sufficient time elapses.

Since typical photon detectors include an avalanche photo diode, it is required to consider a capacitive response in detecting a photon. Therefore, an apparatus, which is included in a photon detector and determines whether an avalanche occurs, has a threshold level that is set higher than the maximum amplitude of the capacitive response. As a result, the photon detector senses only a case where an avalanche signal with an amplitude higher than a predetermined threshold level is generated when a photon is inputted, and determines whether a photon is detected. That is, only when an avalanche with an amplitude higher than the amplitude of a capacitive response arises, the typical photon detectors detect and count a photon.

However, an avalanche with a large amplitude increases a probability that an after pulse is generated, and thus, a dead time is required to be set long. As a result, an avalanche with a large amplitude becomes a cause of that a photon detector, using an avalanche photo diode which operates in a gated Geiger mode, cannot detect a photon at a high speed. In order for the photon detector to detect a photon at a high speed, it is required to reduce a dead time and a probability that an after pulse is generated.

In typical photon detectors, to reduce a dead time and a probability that an after pulse is generated, it is required to raise an avalanche with a low amplitude by controlling the levels and widths of a gate signal and Direct Current (DC) bias voltage that are applied to an avalanche photo diode. In this case, however, it is very difficult for the typical photon detector to detect an avalanche with an amplitude less than a capacitive response. When very largely narrowing a width of a gate signal in order to operate an avalanche photo diode at a high speed in the gated Geiger mode, the generation probability of an after pulse is reduced because the amplitude of an arising avalanche is small, but since it is difficult for the typical photon detector to detect an avalanche signal with a small amplitude as in the above description, it is impossible for an photon detector to operate at a high speed.

To solve the above-described limitations of the typical photon detectors, a method is used where a gate signal of a sine wave is inputted to an avalanche photo diode, and a capacitive response included in an output signal is removed by a band reject filter in an output terminal of a photon detector. In the method, however, since a gate signal has a sine wave, a gate width is much broadened when a photon detector operates at a low speed, and thus, it is difficult to measure the accurate detection time of a photon. Also, when the photon detector operates at a very high speed, it is difficult for a band reject filter to separate a capacitive response from an output signal. Furthermore, there is a limitation in that a current band reject filter is replaced by another appropriate band reject filter in response to the changed frequency, for detecting a photon while continuously changing a frequency of a gate signal.

As another method for solving the above-described limitations of the typical photon detectors, there is a method that divides an output terminal of an avalanche photo diode for two periodically-inputted successive gate signals into two output terminals, inputs two separated signals to a differencing circuit at a predetermined time difference, and thus detects an avalanche signal from a difference between the two signals. However, in such a method, since controlling time delay between the separated signals depends on a length of an electric line, it is difficult to control the delay of time when continuously changing a frequency of a gate signal. Also, when an avalanche simultaneously arises in two gate signals, an error occurs in detecting a photon.

Single Photon Detector

FIG. 1 is a diagram illustrating a single photon detector according to a first embodiment of the present invention.

Referring to FIG. 1, a single photon detector 100 according to the first embodiment of the present invention includes an Avalanche Photo Diode (APD) 101, a mixer 102, an auxiliary signal generator 103, and an avalanche determiner 104.

The APD 101 includes a light receiving element that receives a photon to output an electric signal PS. The electric signal PS, which is outputted with the received photon, includes an avalanche signal. The APD 101 delivers the output signal PS to the mixer 102.

The auxiliary signal generator 103 generates an auxiliary signal AS for effectively detecting an avalanche signal with an amplitude less than the amplitude of a capacitive response of the APD 101, and delivers the generated auxiliary signal AS to the mixer 102.

The mixer 102 receives the output signal PS outputted from the APD 101 and the auxiliary signal AS outputted from the auxiliary signal generator 103. The mixer 102 mixes the output signal PS of the APD 101 and the auxiliary signal AS to delivers a mixed signal MS to the avalanche determiner 104. When an avalanche occurs due to the input of a photon, the amplitude of the mixed signal MS is the maximum in a portion where the avalanche occurs.

The avalanche determiner 104 receives the mixed signal MS from the mixer 102 to determine whether the APD 101 being a light receiving element has received a photon.

Figure 2:
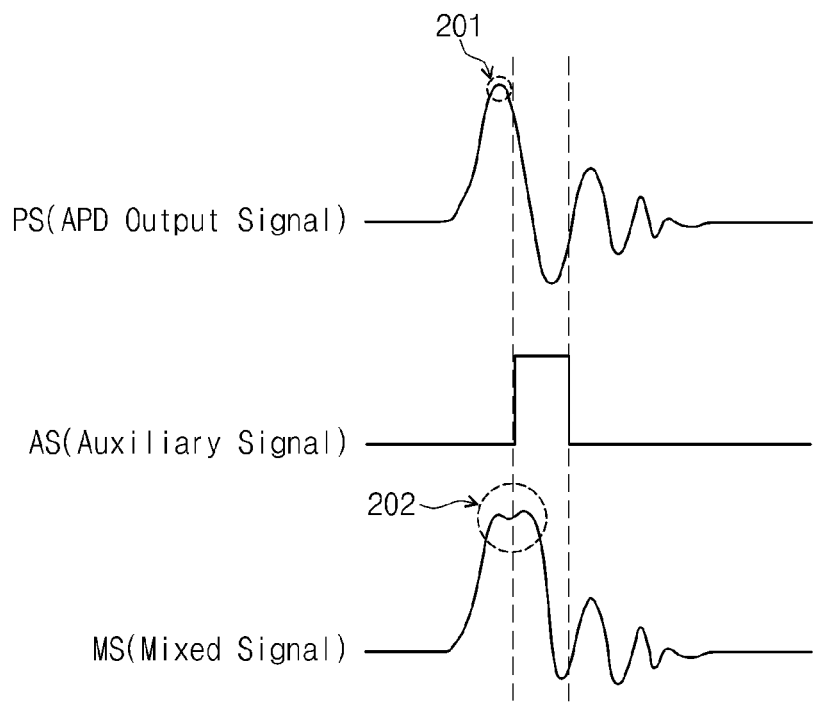
FIG. 2 is diagrams respectively showing signals which are inputted/outputted to/from a mixer of FIG. 1 when an avalanche does not occur.

FIG. 2 is diagrams showing respectively signals which are inputted/outputted to/from the mixer 102 of the single photon detector 100 according to the first embodiment of the present invention when an avalanche does not occur.

Referring to FIG. 2, the output signal PS of the APD 101 (see FIG. 1) shows only a capacitive response. As described above, the capacitive response shows periodic oscillation, and the amplitude of the capacitive response is the maximum in an initial peak 201 point. The auxiliary signal AS is a signal that is generated by the auxiliary signal generator 103, and is mixed with the output signal PS of the APD 101 by the mixer 102. The mixed signal MS is a signal that is generated by mixing the two signals PS and AS, and a point 202 where the amplitude of the mixed signal MS is the maximum is equal to the initial peak 201 point where the amplitude of the capacitive response is the maximum.

Figure 3:
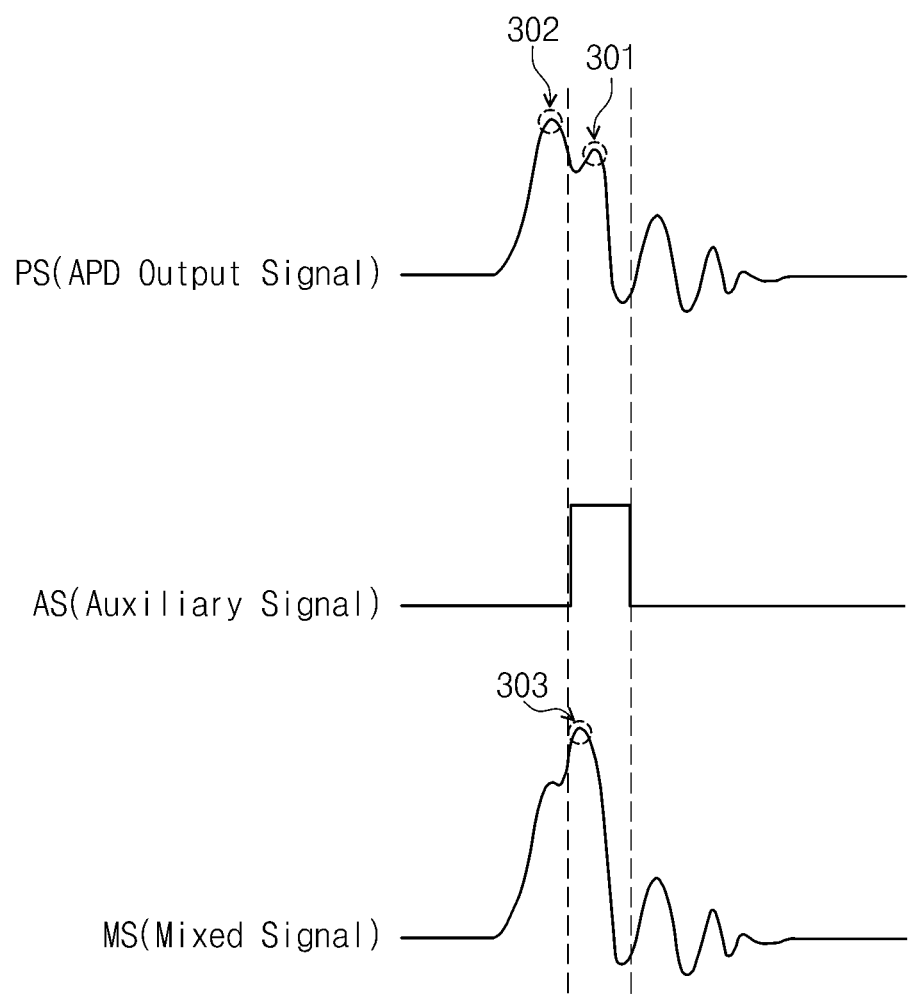
FIG. 3 is diagrams showing respectively signals which are inputted/outputted to/from the mixer of FIG. 1 when an avalanche with an amplitude less than the amplitude of a capacitive response does not occur.

FIG. 3 is diagrams showing respectively signals which are inputted/outputted to/from the mixer 102 of the single photon detector 100 according to the first embodiment of the present invention when an avalanche with an amplitude less than the amplitude of a capacitive response does not occur.

Referring to FIG. 3, the output signal PS of the APD 101 (see FIG. 1) is a signal that is generated by mixing a capacitive response and an avalanche signal generated due to the input of a photon. As described above, the capacitive response shows periodic oscillation, and is mixed with the avalanche signal that is generated due to the input of the photon. A point, where the amplitude of the APD output signal PS of the APD 101 is the maximum, is an initial peak 302 point of the capacitive response. An amplitude 301 of the avalanche signal generated due to the input of a photon is less than the maximum amplitude of the capacitive response.

Unlike in FIG. 2, the point where the amplitude of the mixed signal MS is the maximum is equal to a point where an avalanche has occurred, in which case the amplitude is greater than the maximum amplitude 302 of the capacitive response. Therefore, the single photon detector 100 detects whether an avalanche occurs even when the amplitude 301 of the avalanche signal is less than the maximum amplitude 302 of the capacitive response, and thus can detect whether a photon is inputted.

A typical photon detector has a threshold level that is set higher than the maximum amplitude of a capacitive response, and thus, it is difficult to detect whether a weak avalanche occurs.

On the other hand, as shown in FIG. 3, the single photon detector 100 may generate the mixed signal MS with the auxiliary signal AS, and detect the avalanche peak 303 from the mixed signal MS. Accordingly, the single photon detector 100 may detect whether a weak avalanche occurs even when the single photon detector 100 has a threshold level that is set higher than the maximum amplitude of a capacitive response.

Figure 4:
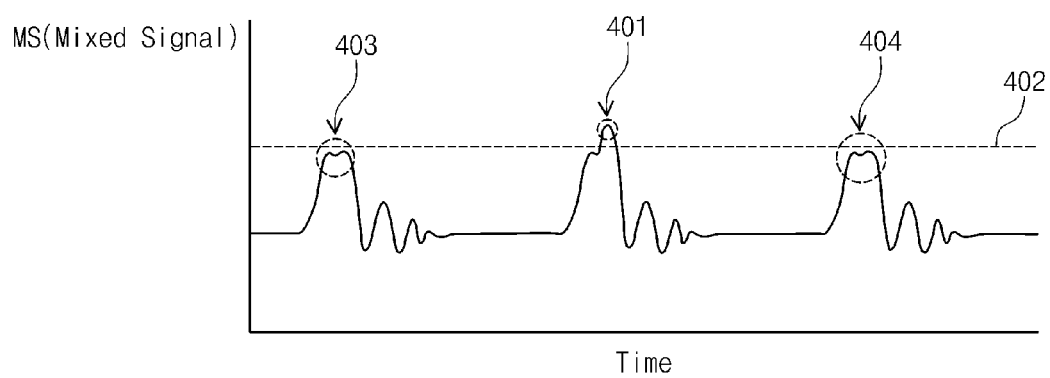
FIG. 4 is a diagram showing a concept for determining a mixed signal and an avalanche signal, in a single photon detector according to the first embodiment of the present invention.

FIG. 4 is a diagram showing a concept for determining the mixed signal MS and the avalanche signal, in the single photon detector 100 according to the first embodiment of the present invention.

Referring to FIG. 4, the mixed signal is continuous with time, and a threshold level 402 of the avalanche determiner 104 is constant.

The mixed signal MS is a signal inputted to the avalanche determiner 104, which detects a case where a signal with an amplitude greater than the threshold level 402 is inputted. The threshold level 402 of the avalanche determiner 104 is set higher than maximum amplitudes 403 and 404 of the mixed signal MS when an avalanche does not occur because a photon is not inputted.

As described above with reference to FIGS. 2 and 3, the mixed signal MS of the mixer 102 shown in FIG. 4 is a signal that is generated by mixing the auxiliary signal AS and the APD output signal PS. In FIG. 4, the mixed signal MS includes three oscillated waveforms, and the amplitude of each of the three waveforms is progressively attenuated. The maximum amplitude 403 of the first waveform, corresponding to a case where a photon is not inputted, is less than the threshold level 402 of the avalanche determiner 104. The maximum amplitude 401 of the second waveform, corresponding to a case where a photon is inputted, is greater than the threshold level 402 of the avalanche determiner 104. The maximum amplitude 404 of the third waveform, corresponding to a case where a photon is not inputted, is less than the threshold level 402 of the avalanche determiner 104.

In FIG. 4, since the maximum amplitude 401 of the second waveform, corresponding to a case where a weak avalanche less than the maximum amplitude of the capacitive response occurs due to the input of the photon, is greater than the threshold level 402 of the avalanche determiner 104, the avalanche determiner 104 determines the occurrence of an avalanche due to the input of the photon in the input of the second waveform, and thus, the single photon detector detects the existence of the photon. Since the maximum amplitude 403 of the first waveform and the maximum amplitude 404 of the third waveform are greater than the threshold level 402 of the avalanche determiner 104, the avalanche determiner 104 determines that an avalanche does not occur because the photon is not inputted, and thus, the single photon detector detects the non-existence of the photon.

Figure 5:
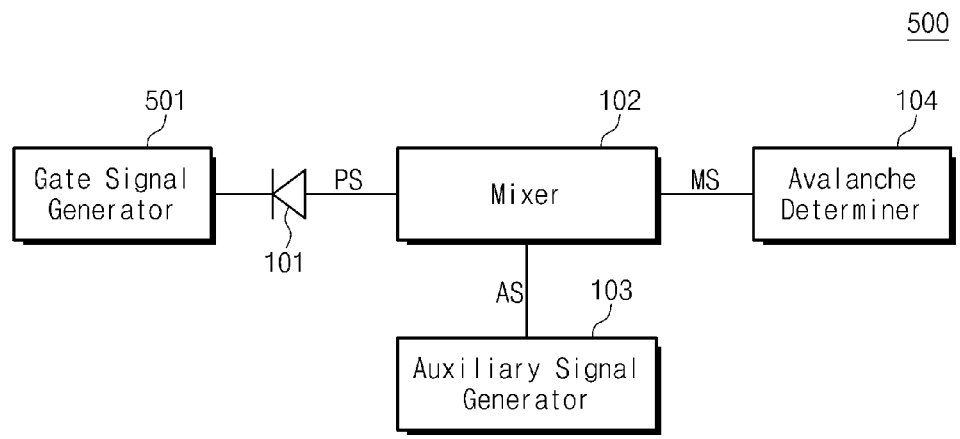
FIG. 5 is a diagram illustrating a single photon detector according to a second embodiment of the present invention.

FIG. 5 is a diagram illustrating a single photon detector 500 according to a second embodiment of the present invention.

Referring to FIG. 5, the single photon detector 500 includes an APD 101, a mixer 102, an auxiliary signal generator 103, an avalanche determiner 104, and a gate signal generator 501.

The single photon detector 500 of FIG. 5 includes the single photon detector 100 of FIG. 1, and further includes the gate signal generator 501. The APD 101, mixer 102, auxiliary signal generator 103, and avalanche determiner 104, being elements other than the gate signal generator 501, are as described above with reference to FIG. 1, and thus their detailed description will not be provided below.

The APD 101 has low quantum efficiency and a high probability that an after pulse is generated, and thus is generally used in a gated Geiger mode.

The gate signal generator 501 generates a gate signal for operating the APD 101 in the gated Geiger mode, and delivers the generated gate signal to the APD 101.

In a typical photon detector that operates in the gated Geiger mode, a speed for detecting a photon and the frequency of a gate signal are limited to lows due to the above-described after pulse and dead time. In the photon detector 500 according to the second embodiment of the present invention, however, since the photon detector 500 detects a weak avalanche signal with the auxiliary signal AS even when the APD 101 operates in the gated Geiger mode, the frequency of a gate signal applied to the APD 101 is not limited to a low due to the above-described after pulse and dead time. That is, since the photon detector 500 detects a photon by determining the occurrence of an avalanche even when a weak avalanche with an amplitude less than a capacitive response occurs, the photon detector 500 can operate at a high speed even in the gated Geiger mode.

Figure 6:
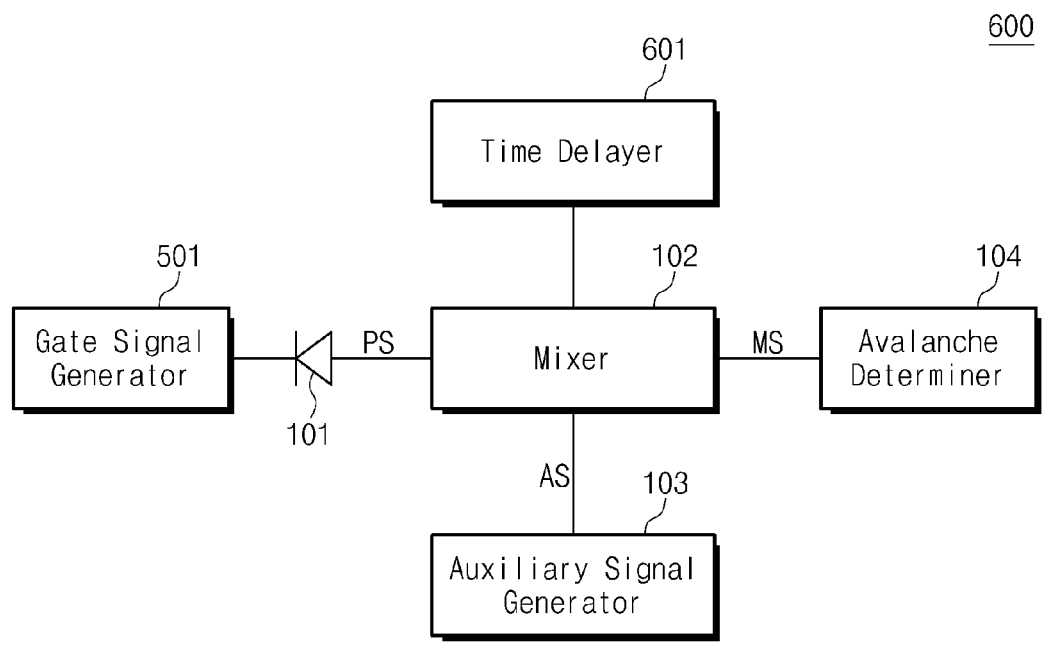
FIG. 6 is a diagram illustrating a single photon detector according to a third embodiment of the present invention.

FIG. 6 is a diagram illustrating a single photon detector 600 according to a third embodiment of the present invention.

Referring to FIG. 6, the single photon detector 600 includes an APD 101, a mixer 102, an auxiliary signal generator 103, an avalanche determiner 104, a gate signal generator 501, and a time delayer 601.

The single photon detector 600 of FIG. 5 includes the single photon detector 500 of FIG. 5, and further includes the time delayer 601. The APD 101, mixer 102, auxiliary signal generator 103, avalanche determiner 104, and gate signal generator 501, being elements other than the time delayer 601, are as described above with reference to FIGS. 1 and 5, and thus their detailed description will not be provided below.

The mixer 102 receives the auxiliary signal AS and the output signal PS of the APD 101, and mixes the two signals AS and PS to output the mixed signal MS. It is more easy to determine whether an avalanche occurs when the amplitude of the mixed signal MS is the maximum in the peak point of the avalanche signal. Therefore, when the two signals AS and PS are mixed, the position (which is a position where an avalanche has occurred) of the avalanche signal or the position of the auxiliary signal AS is required to be aligned in time.

The time delayer 601 controls the mixer 102 such that the output signal PS of the APD 101 and the auxiliary signal AS are aligned in time and mixed. Due to the control of the time delayer 601, the mixed signal MS has the maximum amplitude in a point where an avalanche has occurred, and the avalanche determiner 104 receives the mixed signal MS to determine the mixed signal MS with an amplitude greater than a predetermined threshold level. Therefore, the photon detector 600 detects the occurrence of an avalanche and the input of a photon. In the photon detector 600, also, the frequency of a gate signal is not limited to a low in the gated Geiger mode as in the photon detector 500 of FIG. 5, and thus, the photon detector 600 can detect a photon at a high speed.

Figure 7:
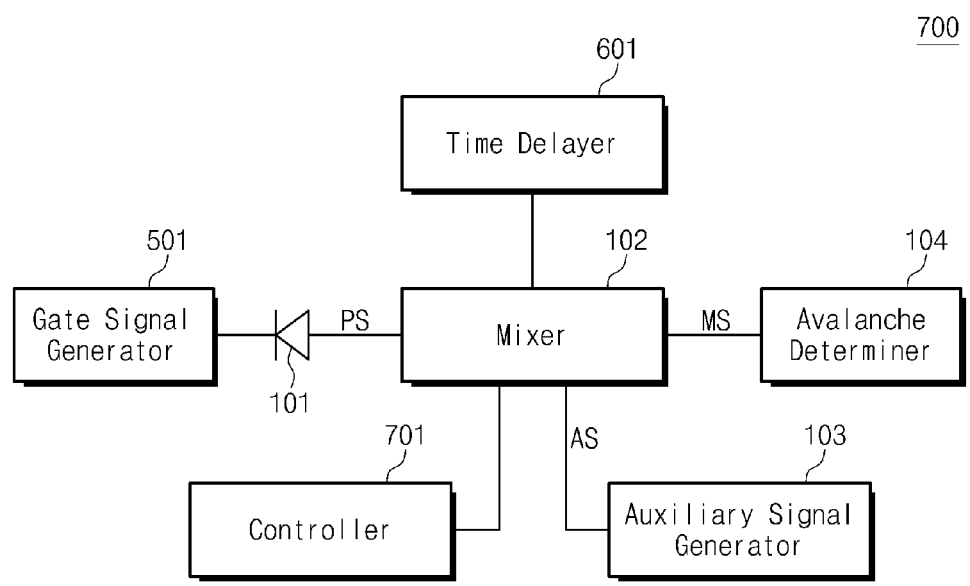
FIG. 7 is a diagram illustrating a single photon detector according to a fourth embodiment of the present invention.

FIG. 7 is a diagram illustrating a single photon detector 700 according to a fourth embodiment of the present invention.

Referring to FIG. 7, the single photon detector 700 includes an APD 101, a mixer 102, an auxiliary signal generator 103, an avalanche determiner 104, a gate signal generator 501, a time delayer 601, and a controller 701.

The single photon detector 700 of FIG. 7 includes the single photon detector 600 of FIG. 6, and further includes the controller 701. The APD 101, mixer 102, auxiliary signal generator 103, avalanche determiner 104, gate signal generator 501, and time delayer 601, being elements other than the controller 701, are as described above with reference to FIGS. 1, 5 and 6, and thus their detailed description will not be provided below.

The mixer 102 receives the auxiliary signal AS and the output signal PS of the APD 101, and mixes the two signals AS and PS to output the mixed signal MS. It is more easy to determine whether an avalanche occurs when the amplitude of the mixed signal MS is the maximum in the peak point of the avalanche signal. Therefore, when the two signals AS and PS are mixed, the position (which is a position where an avalanche has occurred) of the avalanche signal or the position of the auxiliary signal AS is required to be aligned in time. Furthermore, the two signals AS and PS are aligned in time, and moreover, the waveform and amplitude of the auxiliary signal AS and the waveform and amplitude of the output signal PS of the APD 101 are required to be controlled.

The controller 701 controls the mixer 102 such that the waveform and amplitude of the auxiliary signal AS and the waveform and amplitude of the output signal PS of the APD 101 are controlled and the signals PS and AS are mixed. Due to the control of the time delayer 601 and controller 701, the mixed signal MS has the maximum amplitude in a point where an avalanche has occurred, and the avalanche determiner 104 receives the mixed signal MS to determine the mixed signal MS with an amplitude greater than a predetermined threshold level. Therefore, the photon detector 700 detects the occurrence of an avalanche and the input of a photon. In the photon detector 700, also, the frequency of a gate signal is not limited to a low in the gated Geiger mode as in the photon detector 500 of FIG. 5 and the photon detector 600 of FIG. 6, and thus, the photon detector 700 can detect a photon at a high speed.

Photon Number Resolving Detector

Figure 8:
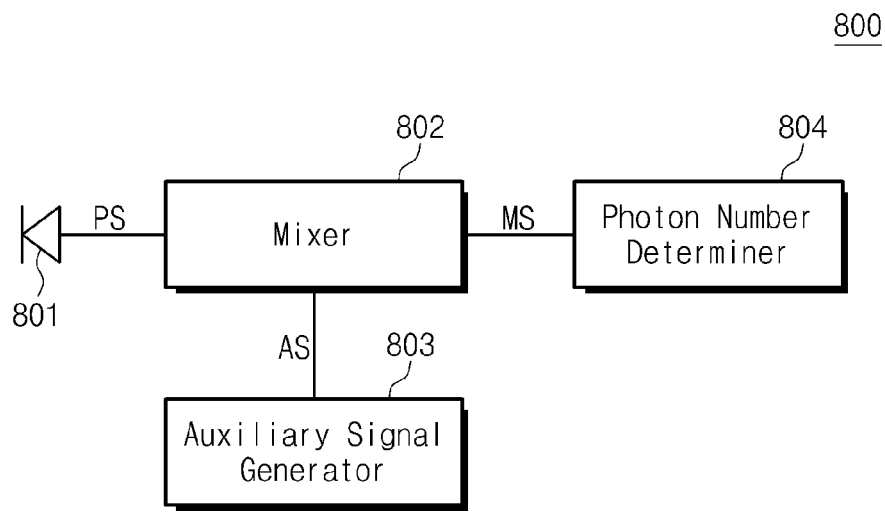
FIG. 8 is a diagram illustrating a photon number resolving detector according to a first embodiment of the present invention.

FIG. 8 is a diagram illustrating a photon number resolving detector according to a first embodiment of the present invention.

Referring to FIG. 8, a photon number resolving detector 800 according to the first embodiment of the present invention includes an APD 801, a mixer 802, an auxiliary signal generator 803, and a photon number determiner 804.

The APD 801 includes a light receiving element that receives a photon to output an electric signal PS. The electric signal PS, which is outputted with the received photon, includes an avalanche signal. The APD 801 delivers the output signal PS to the mixer 802.

The mixer 802 receives the output signal PS outputted from the APD 801 and the auxiliary signal AS outputted from the auxiliary signal generator 803. The mixer 802 mixes the output signal PS of the APD 801 and the auxiliary signal AS to delivers a mixed signal MS to the photon number determiner 804. When an avalanche occurs due to the input of a photon, the amplitude of the mixed signal MS is the maximum in a portion where the avalanche occurs.

The photon number determiner 804 receives the mixed signal MS to determines the number of photons received by the APD 801 being the light receiving element. The photon number determiner 804 may determine the number of photons received by the APD 801, based on the intensity of the mixed signal MS. As a determining method based on the intensity of the mixed signal MS, a determining method based on the maximum amplitude of the mixed signal MS may be used.

Figure 9:
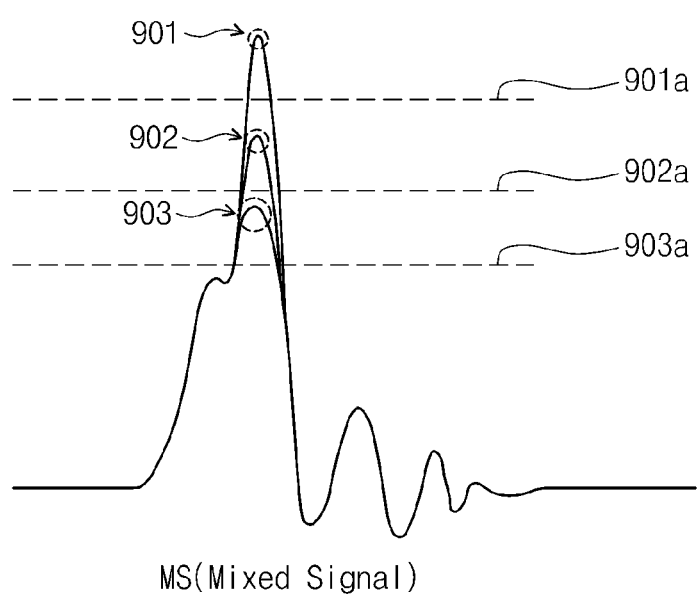
FIG. 9 is a diagram showing a concept for determining a mixed signal and a photon number, in a photon number resolving detector according to a first embodiment of the present invention.

FIG. 9 is a diagram showing a concept for determining a mixed signal and a photon number, in a photon number resolving detector according to a first embodiment of the present invention.

Referring to FIG. 9, the mixed signal MS is a signal that is generated by mixing the auxiliary signal AS and the output signal PS of the APD 801. The photon number determiner 804 has three threshold levels 901a to 901c.

The amplitude of a weak avalanche signal has discontinuous characteristic, which is directly associated with the number of photons inputted to the APD 801. That is, the amplitude of an avalanche signal is proportional to the number of photons inputted to the APD 801, and thus, the amplitude of the output signal PS of the APD 801 including the avalanche signal is proportional to the number of photons inputted to the APD 801. Therefore, the maximum amplitudes 901 to 903 of the mixed signal MS including the APD output signal PS are also proportional to the number of photons inputted to the APD 801.

In FIG. 9, the three threshold levels 901a to 901c are set to be determined according to the maximum amplitude of the mixed signal MS proportional to the number of photons inputted to the APD 801. A case 903, where the maximum amplitude of the mixed signal MS is the lowest, is a case where the number of photons inputted to the APD 801 is one. A case 902, where the maximum amplitude of the mixed signal MS is the intermediate level, is a case where the number of photons inputted to the APD 801 is two. A case 901, where the maximum amplitude of the mixed signal MS is the highest, is a case where the number of photons inputted to the APD 801 is three.

In a detector that resolves and detects the number of photons according to the maximum amplitude of the mixed signal MS, a unit number for counting a photon may be adjusted to two or three depending on the case. To resolve and detect the number of photons by adjusting the unit number, the threshold levels of the photon number determiner 804 are required to be adjusted.

A photon number resolving detector that resolves and detects the number of photons is required to detect the occurrence of a weak avalanche which has an amplitude less than that of a capacitive response. Therefore, when an arbitrary number (which is a natural number) of photons are inputted to the APD 801, the photon number resolving detector 900 can easily detect the number of input photons as well as the input of a photon.

Figure 10:
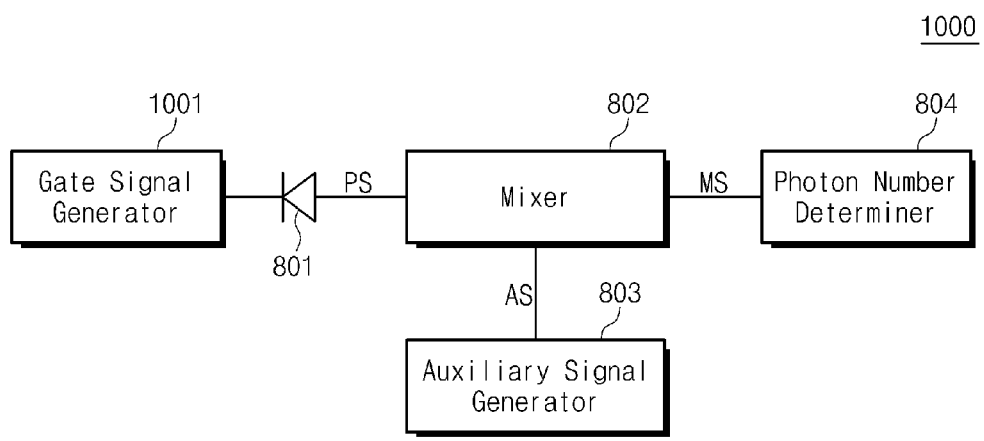
FIG. 10 is a diagram illustrating a photon number resolving detector according to a second embodiment of the present invention.

FIG. 10 is a diagram illustrating a photon number resolving detector according to a second embodiment of the present invention.

Referring to FIG. 10, a photon number resolving detector 1000 according to the second embodiment of the present invention includes an APD 801, a mixer 802, an auxiliary signal generator 803, a photon number determiner 804, and a gate signal generator 1001.

The photon number resolving detector 1000 of FIG. 10 includes the photon number resolving detector 800 of FIG. 8, and further includes the gate signal generator 1001. The APD 801, mixer 802, auxiliary signal generator 803, and photon number determiner 804, being elements other than the gate signal generator 1001, are as described above with reference to FIG. 8, and thus their detailed description will not be provided below.

The APD 801 has low quantum efficiency and a high probability that an after pulse is generated, and thus is generally used in the gated Geiger mode.

The gate signal generator 1001 generates a gate signal for operating the APD 801 in the gated Geiger mode, and delivers the generated gate signal to the APD 801.

In a typical photon detector that operates in the gated Geiger mode, a speed for detecting a photon and the frequency of a gate signal are limited to lows due to the above-described after pulse and dead time. In the photon number resolving detector 1000 according to the second embodiment of the present invention, however, since the photon number resolving detector 1000 detects a weak avalanche signal with the auxiliary signal AS even when the APD 801 operates in the gated Geiger mode, the frequency of a gate signal applied to the APD 801 is not limited to a low due to the above-described after pulse and dead time. That is, since the photon detector 500 detects the input of a photon and the number of input photons by determining the occurrence of an avalanche even when a weak avalanche with an amplitude less than a capacitive response occurs, the photon number resolving detector 1000 can operate at a high speed even in the gated Geiger mode.

Figure 11:
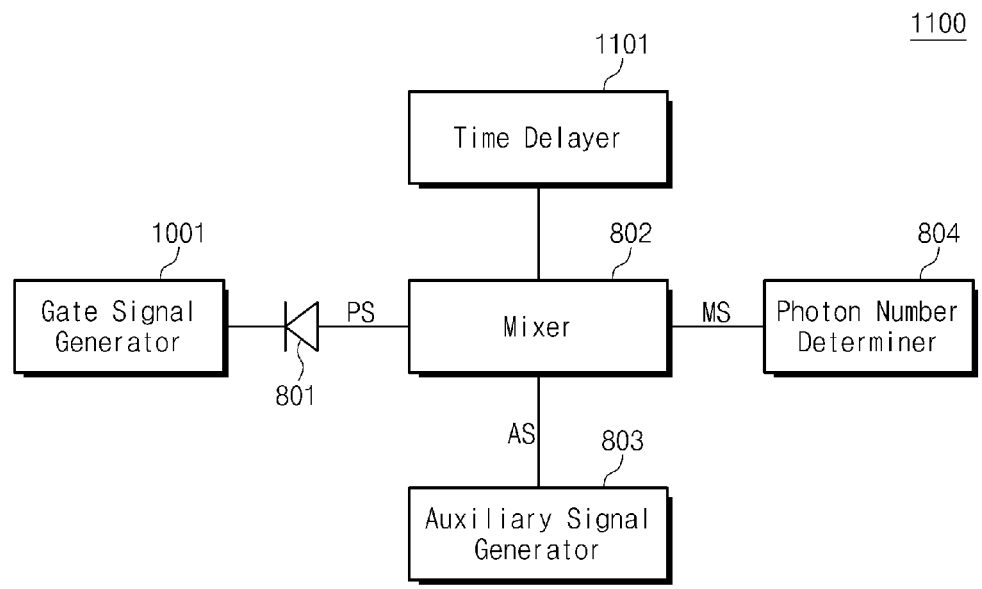
FIG. 11 is a diagram illustrating a photon number resolving detector according to a third embodiment of the present invention.

FIG. 11 is a diagram illustrating a photon number resolving detector according to a third embodiment of the present invention.

Referring to FIG. 11, a photon number resolving detector 1100 according to the third embodiment of the present invention includes an APD 801, a mixer 802, an auxiliary signal generator 803, a photon number determiner 804, a gate signal generator 1001, and a time delayer 1101.

The photon number resolving detector 1100 of FIG. 11 includes the photon number resolving detector 1000 of FIG. 10, and further includes the time delayer 1101. The APD 801, mixer 802, auxiliary signal generator 803, photon number determiner 804, and gate signal generator 1001, being elements other than the time delayer 1101, are as described above with reference to FIGS. 8 and 10, and thus their detailed description will not be provided below.

The mixer 802 receives the auxiliary signal AS and the output signal PS of the APD 801, and mixes the two signals AS and PS to output the mixed signal MS. It is more easy to determine whether an avalanche occurs when the amplitude of the mixed signal MS is the maximum in the peak point of the avalanche signal. Therefore, when the two signals AS and PS are mixed, the position (which is a position where an avalanche has occurred) of the avalanche signal or the position of the auxiliary signal AS is required to be aligned in time.

The time delayer 1101 controls the mixer 802 such that the output signal PS of the APD 801 and the auxiliary signal AS are aligned in time and mixed. Due to the control of the time delayer 1101, the mixed signal MS has the maximum amplitude in a point where an avalanche has occurred, and the photon number determiner 804 receives the mixed signal MS to determine the mixed signal MS with an amplitude greater than a predetermined threshold level. Therefore, the photon number resolving detector 1100 detects the occurrence of an avalanche, the input of a photon, and the number of input photons.

In the photon detector 600, moreover, the frequency of a gate signal is not limited to a low in the gated Geiger mode as in the photon number resolving detector 1000 of FIG. 10, and thus, the photon number resolving detector 1100 can detect a photon at a high speed.

Figure 12:
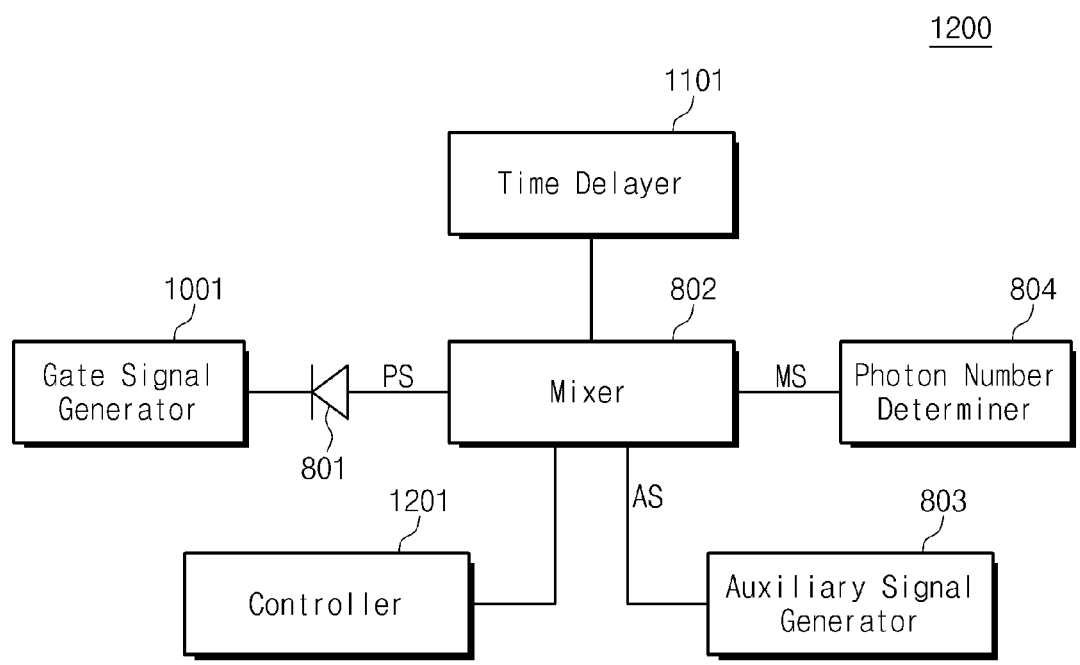
FIG. 12 is a diagram illustrating a photon number resolving detector according to a fourth embodiment of the present invention.

FIG. 12 is a diagram illustrating a photon number resolving detector according to a fourth embodiment of the present invention.

Referring to FIG. 12, a photon number resolving detector 1200 according to the fourth embodiment of the present invention includes an APD 801, a mixer 802, an auxiliary signal generator 803, a photon number determiner 804, a gate signal generator 1001, a time delayer 1101, and a controller 1201.

The photon number resolving detector 1200 of FIG. 11 includes the photon number resolving detector 1100 of FIG. 11, and further includes the controller 1201. The APD 801, mixer 802, auxiliary signal generator 803, photon number determiner 804, gate signal generator 1001, and time delayer 1101, being elements other than the controller 1201, are as described above with reference to FIGS. 8, 10 and 11, and thus their detailed description will not be provided below.

The mixer 802 receives the auxiliary signal AS and the output signal PS of the APD 801, and mixes the two signals AS and PS to output the mixed signal MS. It is more easy to determine whether an avalanche occurs when the amplitude of the mixed signal MS is the maximum in the peak point of the avalanche signal. Therefore, when the two signals AS and PS are mixed, the position (which is a position where an avalanche has occurred) of the avalanche signal or the position of the auxiliary signal AS is required to be aligned in time. Furthermore, the two signals AS and PS are aligned in time, and moreover, the waveform and amplitude of the auxiliary signal AS and the waveform and amplitude of the output signal PS of the APD 801 are required to be controlled.

The controller 1201 controls the mixer 802 such that the waveform and amplitude of the auxiliary signal AS and the waveform and amplitude of the output signal PS of the APD 801 are controlled and the signals PS and AS are mixed. Due to the control of the time delayer 1101 and controller 1201, the mixed signal MS has the maximum amplitude in a point where an avalanche has occurred, and the photon number determiner 804 receives the mixed signal MS to determine the mixed signal MS with an amplitude greater than a predetermined threshold level. Therefore, the photon number resolving detector 1200 detects the occurrence of an avalanche, the input of a photon, and the number of input photons. In the photon number resolving detector 1200, also, the frequency of a gate signal is not limited to a low in the gated Geiger mode as in the photon number resolving detector 1000 of FIG. 10 and the photon number resolving detector 1100 of FIG. 11, and thus, the photon number resolving detector 1200 can detect a photon at a high speed.

The single photon detector and photon number resolving detector according to the embodiments of the present invention detect an avalanche of an amplitude less than the amplitude of a capacitive response.

The single photon detector and photon number resolving detector according to the embodiments of the present invention decrease a probability that an after pulse is generated.

The single photon detector and photon number resolving detector according to the embodiments of the present invention have an enhanced photon count rate.

The single photon detector and photon number resolving detector according to the embodiments of the present invention decrease the influence on the waveform of the gate signal.

The single photon detector and photon number resolving detector according to the embodiments of the present invention enable the continuous change in the frequency of the gate signal.

The above-disclosed subject matter is to be considered illustrative, and not restrictive, and the appended claims are intended to cover all such modifications, enhancements, and other embodiments, which fall within the true spirit and scope of the present invention. For example, the detailed circuit configurations of an APD, mixer, auxiliary signal generator, avalanche determiner, and photon number determiner or a connection relationship of a previous element and next element may be variously changed or modified according to an environment or usability. Thus, to the maximum extent allowed by law, the scope of the present invention is to be determined by the broadest permissible interpretation of the following claims and their equivalents, and shall not be restricted or limited by the foregoing detailed description.

What is claimed is:

1. A photon number detector comprising:
   an auxiliary signal generator configured to generate an auxiliary signal;
   a light receiving element configured to receive a photon to output an electric signal;
   a mixer configured to receive an output signal of the light receiving element and the auxiliary signal and to mix the received output signal and the received auxiliary signal; and
   a photon number determiner configured to receive the mixed signal of the mixer to determine the number of photons received by the light receiving element.

2. The photon number detector of claim 1, wherein the photon number determiner classifies the mixed signal based on intensity to determine the number of received photons.

3. The photon number detector of claim 2, wherein the photon number determiner has a plurality of threshold levels, each of the threshold levels being set higher than a predetermined amplitude of a capacitive response of the light receiving element and set to classify the mixed signal, which is generated due to N number of photons (where N is a natural number), based on intensity.

4. A single photon detector comprising:
   an auxiliary signal generator configured to generate an auxiliary signal;
   a light receiving element configured to receive a photon to output an electric signal;
   a mixer configured to receive an output signal of the light receiving element and the auxiliary signal and to mix the received output signal and the received auxiliary signal;
   a determiner configured to receive the mixed signal of the mixer to determine whether the photon is received; and
   a controller controlling a waveform and amplitude of the electric signal or auxiliary signal.

5. The single photon detector of claim 4, wherein,
   the light receiving element is an avalanche photo diode, and
   the electric signal comprises an avalanche signal.

6. The single photon detector of claim 5, wherein the determiner comprises an avalanche determiner determining whether an avalanche occurs.

7. The single photon detector of claim 6, wherein a threshold level of the avalanche determiner is set higher than a predetermined amplitude of a capacitive response of the avalanche photo diode.

8. The single photon detector of claim 7, wherein the avalanche photo diode operates in a gated Geiger mode.

9. The single photon detector of claim 8, further comprising a gate signal generator configured to generate a gate signal to deliver the gate signal to the avalanche photo diode.

10. The single photon detector of claim 9, further comprising a time delayer configured to align the avalanche signal or the auxiliary signal in time.

* * * * *